United States Patent
Garrett et al.

(10) Patent No.: US 9,545,590 B2
(45) Date of Patent: Jan. 17, 2017

(54) ROTATING CENTRIFUGAL PARTICLE SEPARATOR AND GASIFIER HAVING THE SAME

(71) Applicant: InnerPoint Energy Corporation, Kirkwood, MO (US)

(72) Inventors: Scott Garrett, Kirkwood, MO (US); Andrew Schlote, Kirkwood, MO (US)

(73) Assignee: INNERPOINT ENERGY CORPORATION, Kirkwood, MO (US)

(*) Notice: Subject to any disclaimer, the term of this patent is extended or adjusted under 35 U.S.C. 154(b) by 0 days.

(21) Appl. No.: 14/598,622

(22) Filed: Jan. 16, 2015

(65) Prior Publication Data
US 2016/0206985 A1 Jul. 21, 2016

(51) Int. Cl.
B01D 45/12 (2006.01)
B01D 45/14 (2006.01)
B01D 46/00 (2006.01)
C10J 3/84 (2006.01)
C10K 1/02 (2006.01)

(52) U.S. Cl.
CPC ............. B01D 45/14 (2013.01); C10J 3/84 (2013.01); C10K 1/026 (2013.01); *C10J 2200/39* (2013.01)

(58) Field of Classification Search
CPC ..... B01D 45/14; B01D 46/0073; B01D 45/12; C10J 3/84
See application file for complete search history.

(56) References Cited

U.S. PATENT DOCUMENTS

| 3,538,657 | A  |   | 11/1970 | Macrow |
|---|---|---|---|---|
| 4,783,259 | A  |   | 11/1988 | Wade |
| 4,902,196 | A  |   | 2/1990  | Byrd |
| 5,272,866 | A  | * | 12/1993 | Nieminen ............... C10J 3/84 110/264 |
| 5,607,487 | A  |   | 3/1997  | Taylor |
| 5,922,092 | A  |   | 7/1999  | Taylor |
| 7,615,088 | B2 | * | 11/2009 | Benedictus ........... A47L 9/1608 55/337 |
| 8,562,701 | B2 |   | 10/2013 | Heidenreich et al. |
| 2002/0096050 | A1 |   | 7/2002 | Miles |
| 2002/0178919 | A1 |   | 12/2002 | Miles |
| 2007/0094929 | A1 |   | 5/2007 | Kang et al. |
| 2010/0043364 | A1 |   | 2/2010 | Curien |

(Continued)

*Primary Examiner* — Timothy Vanoy
(74) *Attorney, Agent, or Firm* — Thompson Coburn, LLP; Clyde Smith

(57) ABSTRACT

A method of separating solid particles from gaseous matter comprises rotating a spinner about a spinner axis in a rotational direction. The spinner has fluid passageways that operatively connect a gaseous inlet environment to a gaseous outlet environment. The fluid passageways circumferentially extending in a direction opposite the rotational direction as the fluid passageways extend radially inward. The method further comprises forcing gaseous matter radially inward through the rotating spinner by creating pressure differential that is such that the pressure of the gaseous inlet environment exceeds the pressure of the gaseous fluid outlet. An assembly comprises a spinner configured to rotate in a rotational direction. The spinner has fluid passageways that operatively connect a gaseous inlet environment to a gaseous outlet environment. A heating element is positioned adjacent to the spinner in a manner such that particles flung from the spinner can strike the heating element.

15 Claims, 9 Drawing Sheets

(56) References Cited

U.S. PATENT DOCUMENTS

2010/0223848 A1    9/2010   Heidenreich et al.
2015/0128544 A1*   5/2015   Roston .................. B01D 45/14
                                                                                   55/471

* cited by examiner

ROTATING CENTRIFUGAL PARTICLE SEPARATOR AND GASIFIER HAVING THE SAME

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

This invention pertains to a rotating centrifugal particle separator for preventing particulates suspended in gaseous matter from entering a passageway. More particularly, the present invention pertains to a centrifugal separator that comprises a spinner that revolves about an axis adjacent to an inlet into the passageway. The revolution of the spinner prevents particulates from entering the passageway, but allows gaseous matter to enter the passageway. The centrifugal separator was developed particularly for use in connection with gasifiers, but it also has use in connection with other systems and devices. A heating element may be provided adjacent the spinner to burn particles flung outward from the spinner or to prevent caking and build-up of tar and particles around the filter, and to facilitate gasification of soot and catalytic cracking of tars.

General Background

U.S. Patent Publication No. 2013/0125848 A1 discloses a rotating centrifugal particle separator similar in basic operation to the rotating centrifugal particle separator of the present invention. That publication also discloses the use of such a device in a gasifier. The present invention overcomes some disadvantages associated with said prior art device.

During the gasification process of some fuels, such as wood, grass, and other biofuels, particulates of ash, tar, unburned solid fuel, and other liquids and solids become suspended in the syngas within the gasifier. When drawing out syngas from gasifiers, such particulates are often drawn out along with the syngas. Thus, it is desirable to filter or separate such particulates from the syngas. This is typically done downstream of the gasifier. However, as disclosed in U.S. Patent Publication No. 2013/0125848 A1, it can be done within the gasifier in a manner that is highly advantageous to the gasification process.

U.S. Patent Publication No. 2013/0125848 A1 discloses a device comprising a spinning particle separator having bristles that are configured to cause particulate laden gas to swirl about the axis of the spinner before passing through openings of the spinner that allow such gas to travel through and beyond the spinner. Unfortunately, due to the gaps between the bristles, some gas particles can pass through the openings without first achieving the circumferential velocity of the bristles. Additionally, when used in a gasifier, some particles that are flung outward by the rotating bristles have the tendency to accumulate against the side wall of the gasifier. Such accumulation of particles is problematic.

SUMMARY OF THE INVENTION

A spinning centrifugal particle separator in accordance with the present invention can be utilized in harsh environments, such as in gasifiers. By providing the particle separator in the gasifier itself, the particles remain in the gasifier, where they are ultimately gasified. A heating element may be provided adjacent the spinner of the particle separator to burn or crack particles flung from the spinner.

In one aspect of the invention, a method of separating solid particles from gaseous matter comprises rotating a spinner about a spinner axis in a rotational direction. The spinner has bound fluid passageways that operatively connect a gaseous inlet environment to a gaseous outlet environment. The fluid passageways circumferentially extend in a direction opposite the rotational direction as the fluid passageways extend radially inward. The method further comprises forcing gaseous matter radially inward through the rotating spinner by creating pressure differential that is such that the pressure of the gaseous inlet environment exceeds the pressure of the gaseous fluid outlet.

In another aspect of the invention, an assembly comprises a spinner and a heating element. The spinner is configured and adapted to rotate about a spinner axis in a rotational direction and has fluid passageways that operatively connect a gaseous inlet environment to a gaseous outlet environment. The heating element is positioned adjacent to the spinner in a manner such that particles flung from the spinner can strike the heating element.

Further features and advantages of the present invention, as well as the operation of the invention, are described in detail below with reference to the accompanying drawings.

Figure 1:
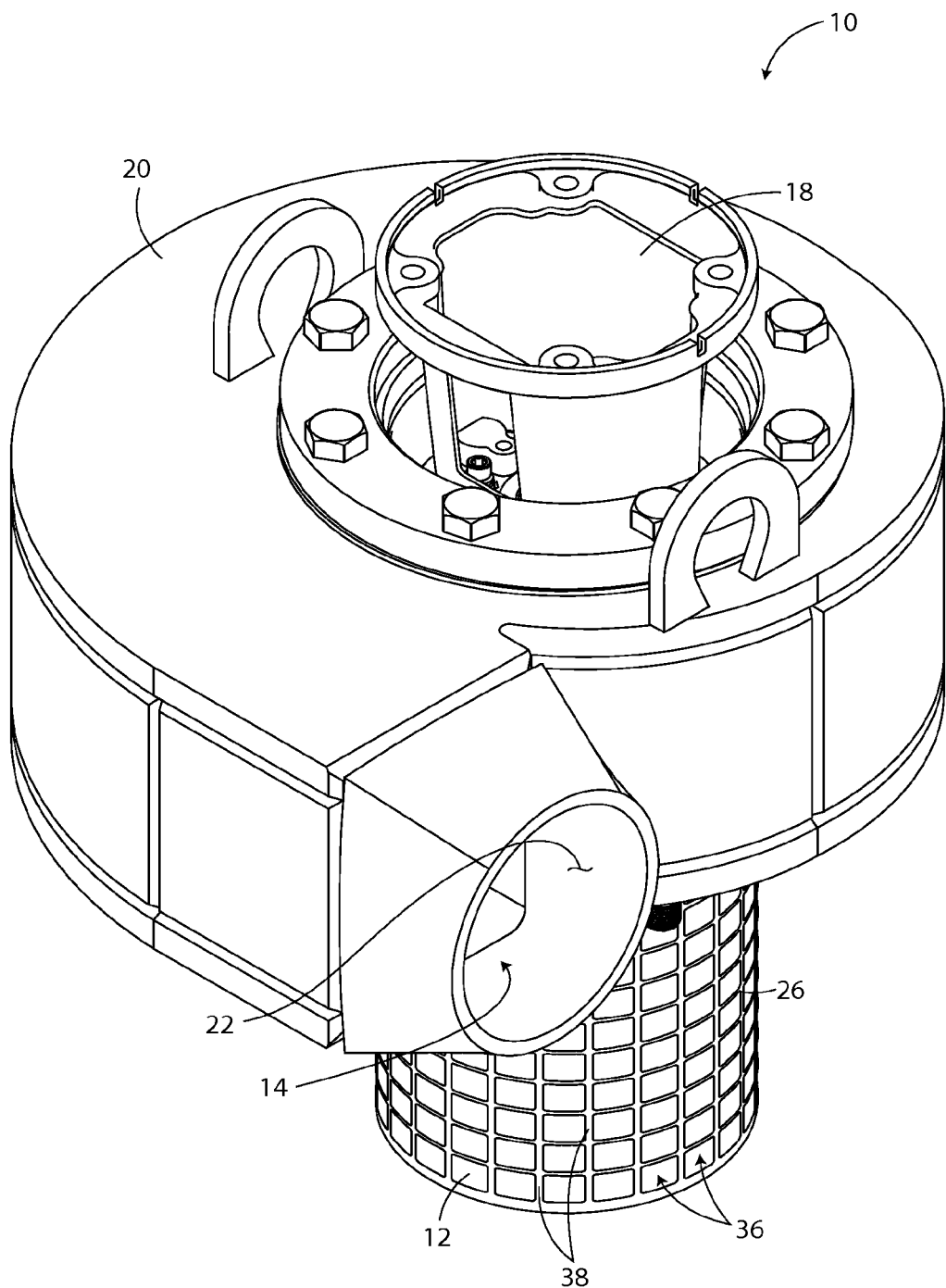
FIG. 1 depicts a perspective view of a centrifugal particle separator assembly in accordance with the invention.
Figure 2:
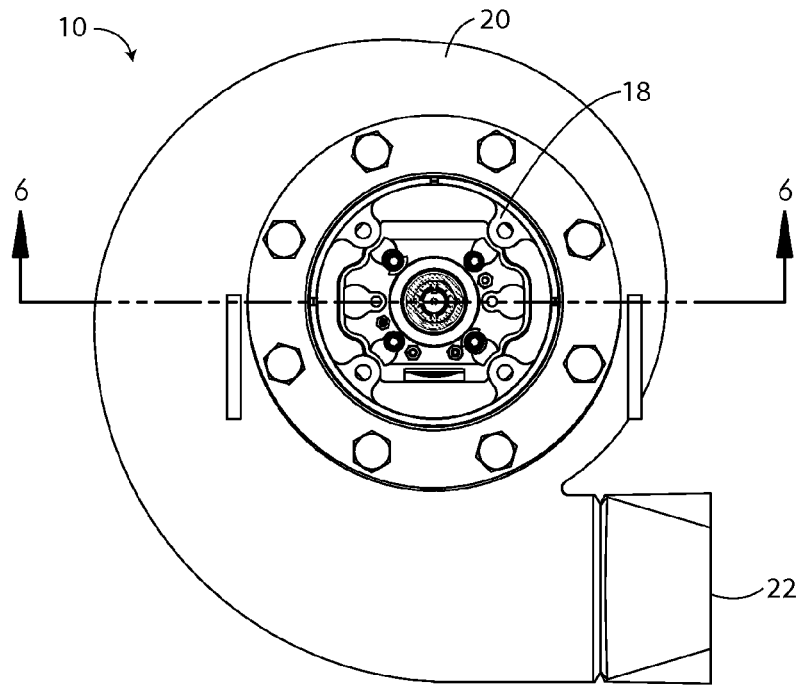
FIG. 2 depicts a top view of the centrifugal particle separator assembly shown in FIG. 1.
Figure 3:
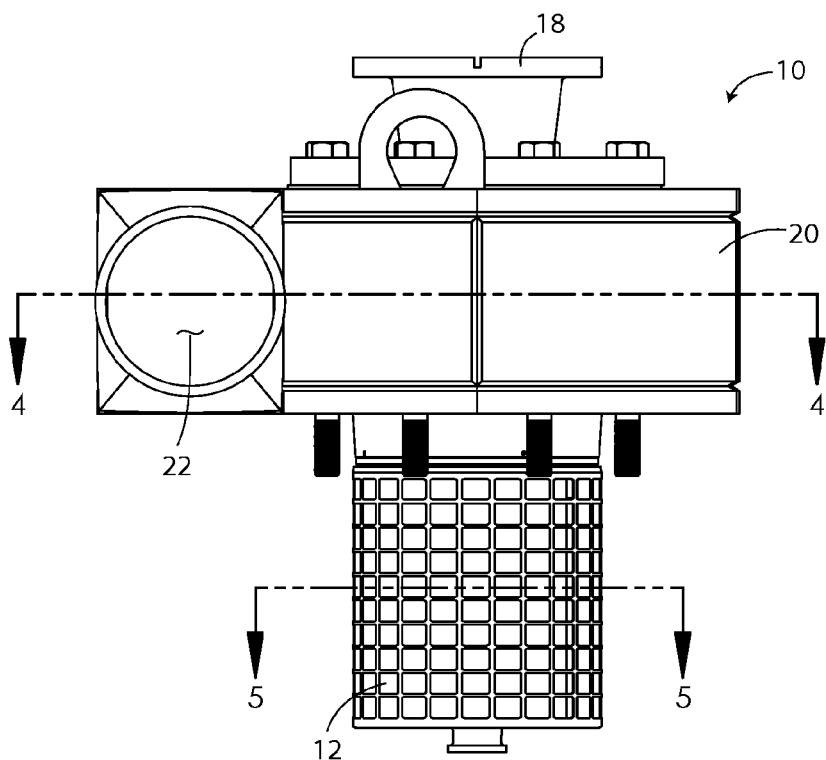
FIG. 3 depicts a right side elevation view of the centrifugal particle separator assembly shown in FIGS. 1 and 2.
Figure 4:
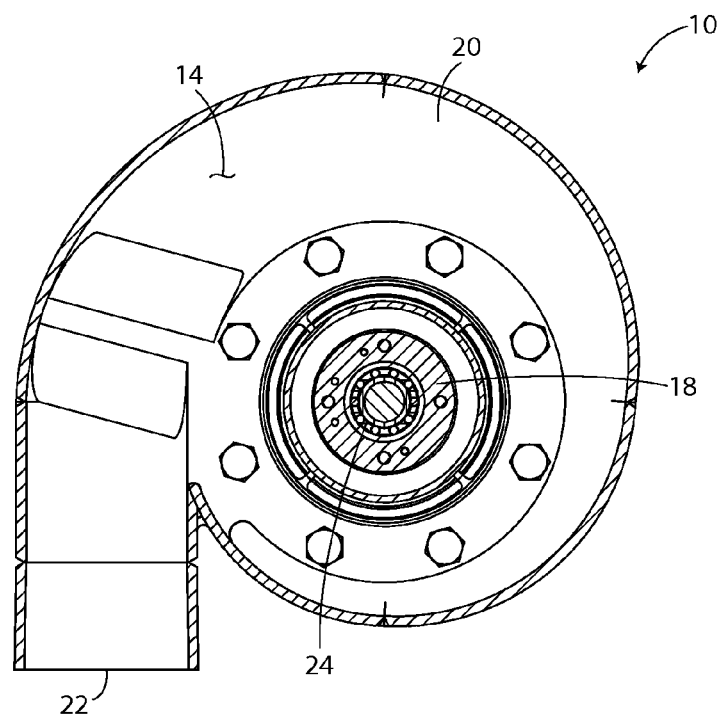
FIG. 4 depicts a cross-sectional view of the centrifugal particle separator assembly taken about the line 4-4 shown in FIG. 3.

Reference numerals in the written specification and in the drawing figures indicate corresponding items.

DETAILED DESCRIPTION

A centrifugal particle separator assembly 10 in accordance with the invention is shown in FIGS. 1 through 6. The particle separator 10 comprises a spinner 12, a filtered-gas passageway 14, a driveshaft 16, a motor mount 18, and a volute 20. The filtered-gas passageway 14 operatively connects the gaseous inlet environment surrounding the spinner 12 to a gas outlet 22 of the volute 20. The motor mount 18 extends through the volute 20 and comprises thrust bearings 24 that support the driveshaft 16 in a manner such that the driveshaft and spinner 12 are able to revolve about a spinner axis relative to the motor mount and volute. The motor mount 18 is also configured to support an electric, hydraulic, pneumatic, or alternatively powered motor 25 in a manner such that the motor can rotate the driveshaft 16.

Figure 5:
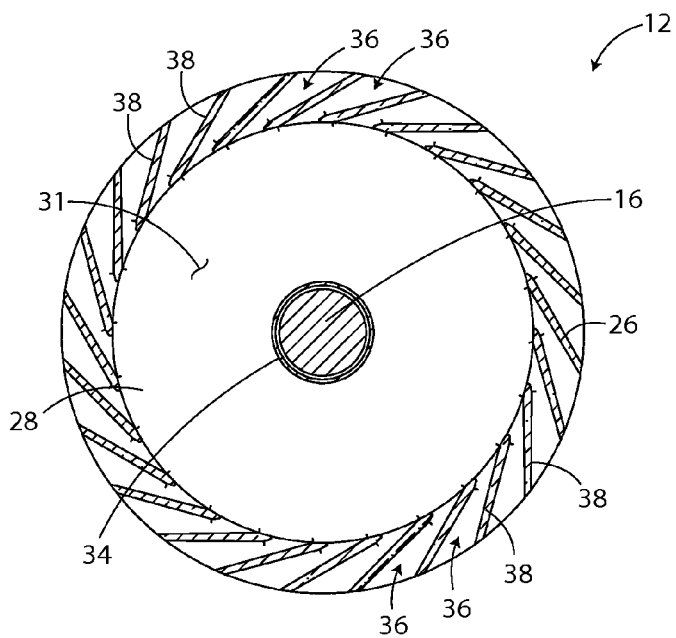
FIG. 5 depicts a cross-sectional view of the centrifugal particle separator assembly taken about the line 5-5 shown in FIG. 3.
Figure 6:
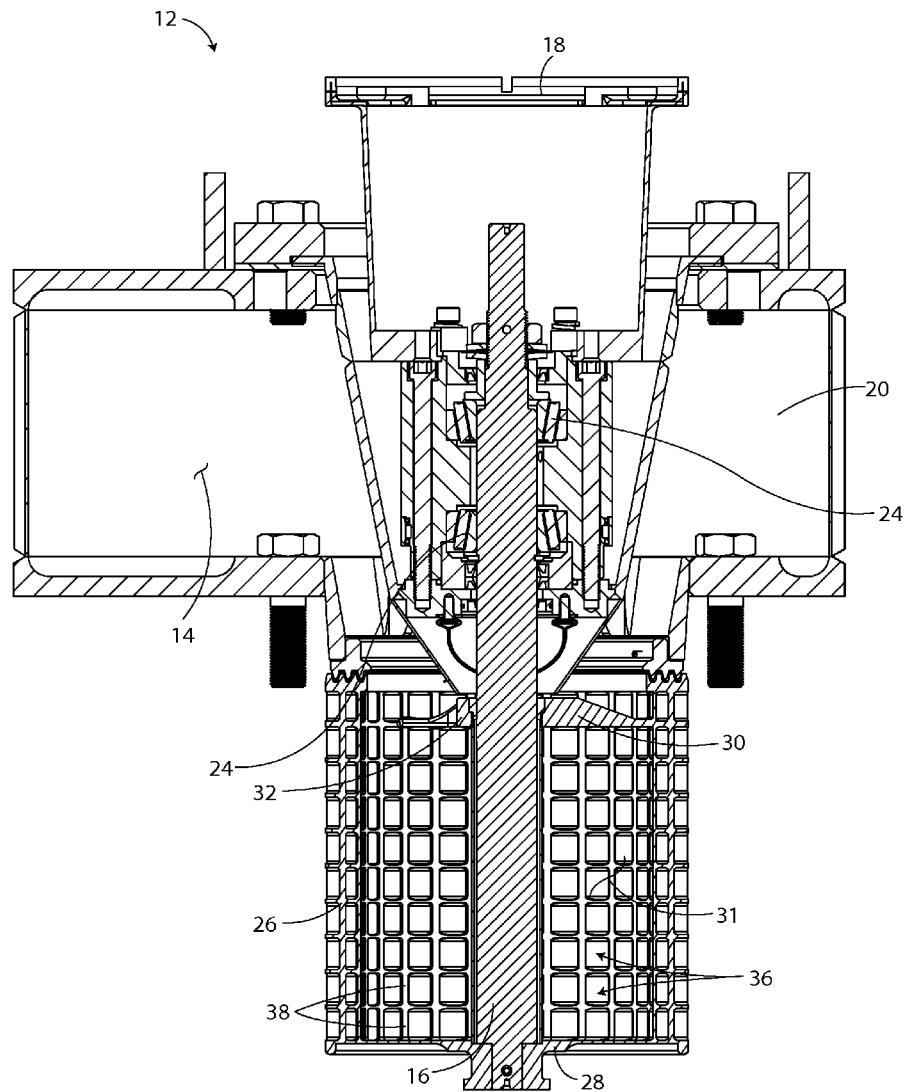
FIG. 6 depicts a cross-sectional view of the centrifugal particle separator assembly taken about the line 6-6 shown in FIG. 2, which is parallel to and coincident with the spinner axis.
Figure 7:
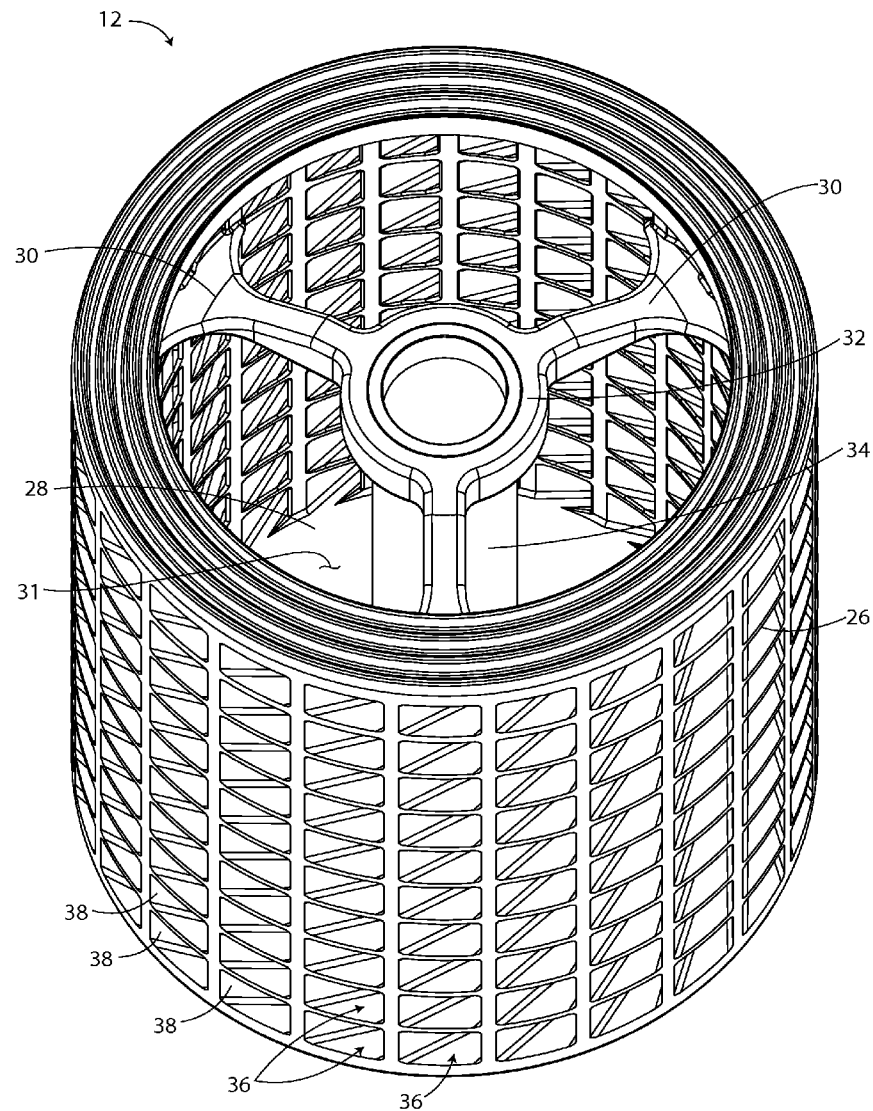
FIG. 7 depicts a perspective view of the spinner of the centrifugal particle separator assembly.

As is most clear in FIGS. 5 through 7, the spinner 12 comprises a cylindrical gas permeable wall 26, a circular end cap 28, and upper support spokes 30. The cylindrical wall 26 is preferably nine inches (approximately 23 cm) in diameter. The cylindrical wall 26 and the end cap 28 define an internal cavity 31 of the spinner 12. The support spokes extend from a central hub 32. The cylindrical wall 26, the end cap 28, and the support spokes 30 are preferably integrally formed as a cast monolithic piece of, for example, titanium aluminide. A high temperature driveshaft sleeve 34 extends centrally from the hub 32 to the center of the end cap 28. The sleeve 34 is adapted to receive the driveshaft 16 of the particle separator 10. The cylindrical wall 26 is made permeable by a plurality of fluid passageways 36 that are skewed circumferentially as they extend radially through the cylindrical wall. A plurality of skewed vanes 38 separate the fluid passageways 36 from each other.

The particle separator 10 is configured such that the spinner 12 rotates in a particular rotational direction. The vanes 38 and the fluid passageways 36 of the spinner 10 skew circumferentially in the opposite rotational direction as they extend radially inward. As shown most clearly in FIG. 5, each of the fluid passageways 36 converges as it extends radially inward, thus causing the gas to accelerate as it passes through the fluid passageways 36. This acceleration of the gas in the fluid passageways 36 causes the gas pressure to reduce, which can cause additional tars to condense into particles. The condensed particles are then too dense to overcome the centrifugal forces, resulting in such particles also being separated from the gas and flung from the spinner. Spinning the filter increasingly faster can result in a lowering of the dew point of tar vapors that make it through the spinner. Particulates entering any of the fluid passageways 36 also tend to not be able to travel through the passageway without contacting the trailing vane 38, due to the greater inertia of the particulates compared to the gas molecules. Thus, the vane 38 then deflects the particulates radially outward and prevents the particulates from reaching the internal cavity 31 of the spinner 12. It should be appreciated that orientation of the vanes in relation to the direction of the rotation of the spinner 12 causes the spinner to act somewhat like a squirrel-cage blower. However, when in use, the pressure differential between the gas surrounding spinner 12 and the gas within the volute 20 overcomes the blower effect and channels gas through the fluid passageways of the cylindrical wall 26 of the spinner 12 and into the internal cavity 31 of the spinner. From there, the gas passes up into the volute 20 and is ultimately discharged from the gas outlet 22 of the volute.

In view of the configuration and method of operating the particle separator 10 as described above, it should be appreciated that any gas passing through the fluid passageways 36 of the spinner 12 must travel faster than the circumferential velocity of the outer surface of the cylindrical wall 26 of the spinner. Preferably the spinner 12 operates at a minimum of 4000 revolutions per minute. Even more preferably, the spinner 12 operates at speeds up to 7000 revolutions per minute. At these rotational speeds, even tiny particles or droplets of liquid cannot overcome the centrifugal forces and therefore cannot pass through the fluid passageways 36 of the spinner 12.

Figure 10:
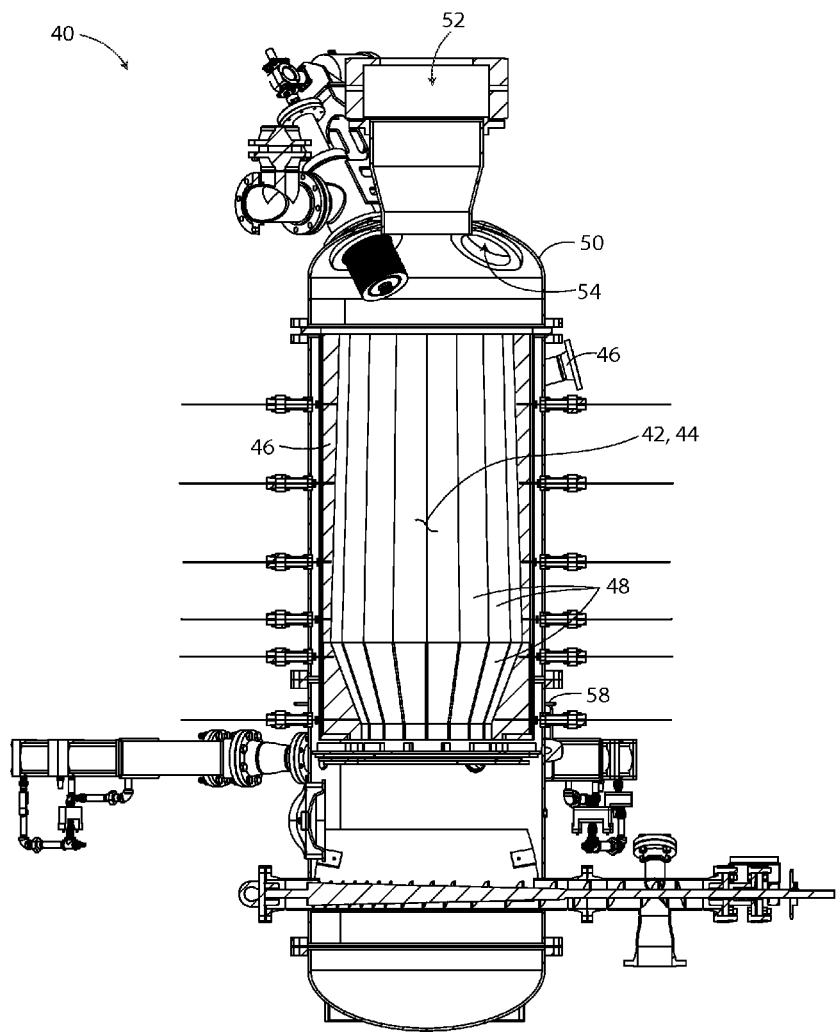
FIG. 10 depicts a cross-sectional view of the prior art gasifier disclosed in U.S. Pat. Pub. No. 2013/0125848.
Figure 11:
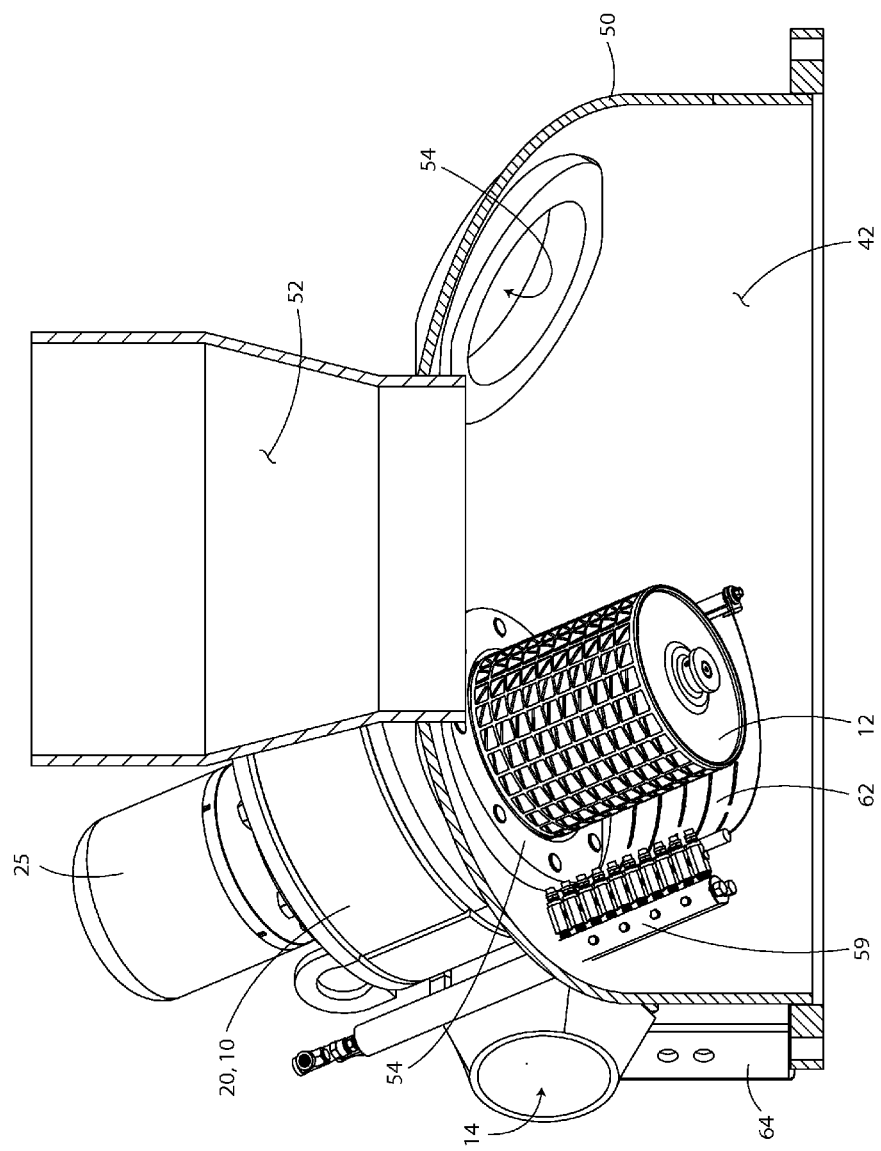
FIG. 11 depicts the upper portion of a gasifier having the centrifugal particle separator assembly and the heating element assembly of the present invention.

FIG. 10 depicts the prior art gasifier and centrifugal particle separator disclosed in U.S. Pat. Pub. No. 2013/0125848. The centrifugal particle separator 10 assembly of the present invention attached to said gasifier 40 is shown in place of the prior art centrifugal particle separator in FIG. 11. The gasifier 40 is configured to gasify bio-fuels, petroleum based fuels, and virtually any type of fuel that can be gasified. The gasifier 40 comprises an internal chamber 42 that has a main combustion region 44. The main combustion region 44 is encircled by a ceramic wall 46 that is formed out of a plurality of ceramic blocks 48. The top of the main combustion region 44 is bounded by a dome-shaped top cover 50. The top cover 50 comprises a centrally positioned fuel inlet port 52 and a plurality of utility ports 54 spaced circumferentially around the fuel inlet port. Referring to FIG. 11, a particle separator 10 in accordance with the present invention is attached to one of the utility ports 54 in a manner such that the spinner 12 of the particle separator is positioned within the internal chamber 42 of the gasifier 40 and such that the volute 20 of the particle separator is external to the internal chamber. The filtered-gas passageway 14 of the particle separator 10 serves as the gasified-fuel outlet passageway. The other utility ports 54 can serve as service access ports for measuring equipment, additional fuel inlet ports, additional gasified-fuel outlet passageways, and a variety of other things.

In use, fuel is introduced into the main combustion region 44 of the gasifier 40 through the fuel inlet port 52 located on the top cover 50 of the gasifier. Additionally, air is introduced into the main combustion region 44 via air inlet tubes 46. Water may also be discharge into the internal chamber 42 of the gasifier 50 via a water injection system 58 to provide additional hydrogen and oxygen for the gasification process.

The gasification of the fuel creates hydrogen, carbon monoxide, carbon dioxide, liquid particles (such as tar), solid particles (including ash), and many other gases. The pressure within the internal chamber 42 of the gasifier 40 is greater than the pressure within the filtered-gas passageway 14 of the particle separator 10. As such, the matter within the internal chamber 42 of the gasifier 40 will attempt to escape from the internal chamber via the filtered-gas passageway 14 of the particle separator 10. To do so however, the matter must pass through the revolving spinner 12 of the particle separator 10. Due to the density of the liquids and particles within the matter, such liquids and particles are flung radially outward from the spinner 12 by the vanes 38 of the spinner, and therefore are not able to pass through the cylindrical wall 26 of the spinner. As such, the gaseous matter that is able to escape the internal chamber 42 of the gasifier 40 through the spinner 12 is substantially free of particles and droplets. This allows the gasifier 40 to operate at a relatively high throughput. The higher throughput has a direct benefit in increasing the superficial velocity in the gasifier 40, which decreases the amount of tar produced, increases the quality of syngas produced and increases the conversion efficiency of the gasifier. Still another benefit of using the centrifugal separator 10 in the gasifier 40 is that it allows the gasifier to operate at a very high output despite its compact volume (the output can be as much as five times the output of conventional gasifiers of equal size). The configuration of the particle separator 10 allows the drive motor 25 that rotationally drives the driveshaft 16 of the drive mechanism 16 to be positioned external to the internal chamber 42 of the gasifier and filtered gas passageway 14 of the particle separator. As such the drive motor 25 and the bearings 24 of the particle separator 10 need not be exposed to the high temperatures within the filtered gas passageway 14 of the particle separator. It should also be appreciated that since the spinner 12 of the particle separator 10 repels particulates, the spinner is generally self-cleaning and its performance remains generally constant. That being said, an optional waterjet washer 59 (FIG. 11) having jet nozzles 59 aimed tangentially toward the spinner 12 and aligned with the fluid passageways 36 can be provided as a permanent part of the gasifier 40. By periodically blasting high pressure water from the waterjet washer 59, the spinner 12 remains clean. Additionally, the water injection can be used as a source of temperature control for the top of the gasifier 40.

Figure 8:
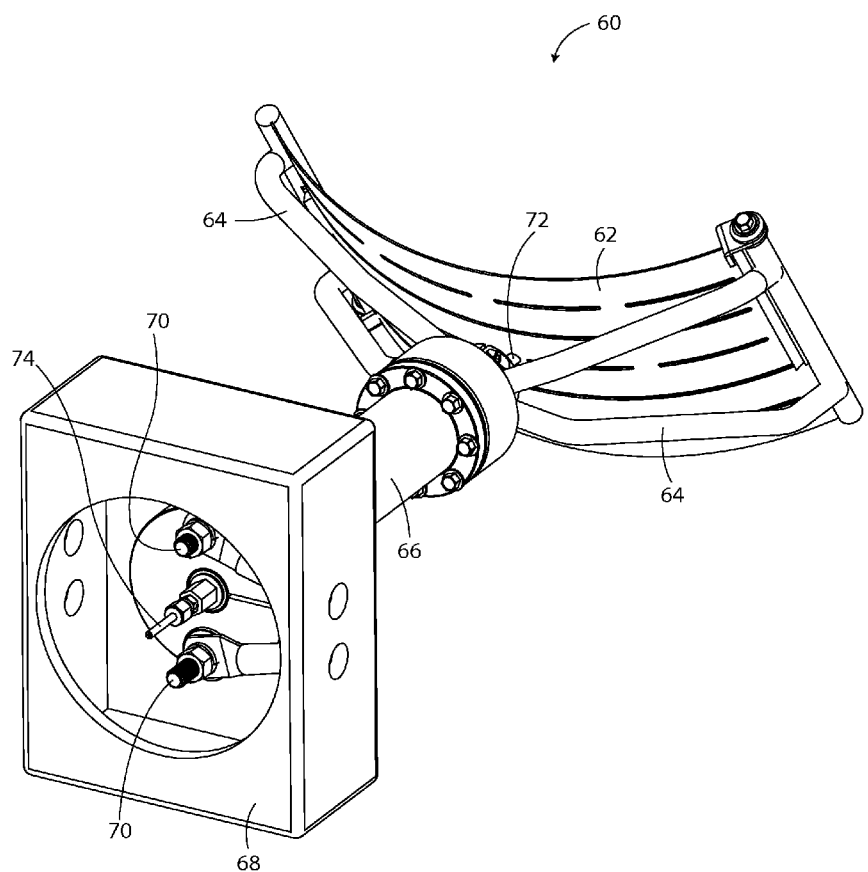
FIG. 8 depicts a perspective view of a heating element assembly that is configured and adapted for use in connection with the centrifugal particle separator assembly.
Figure 9:
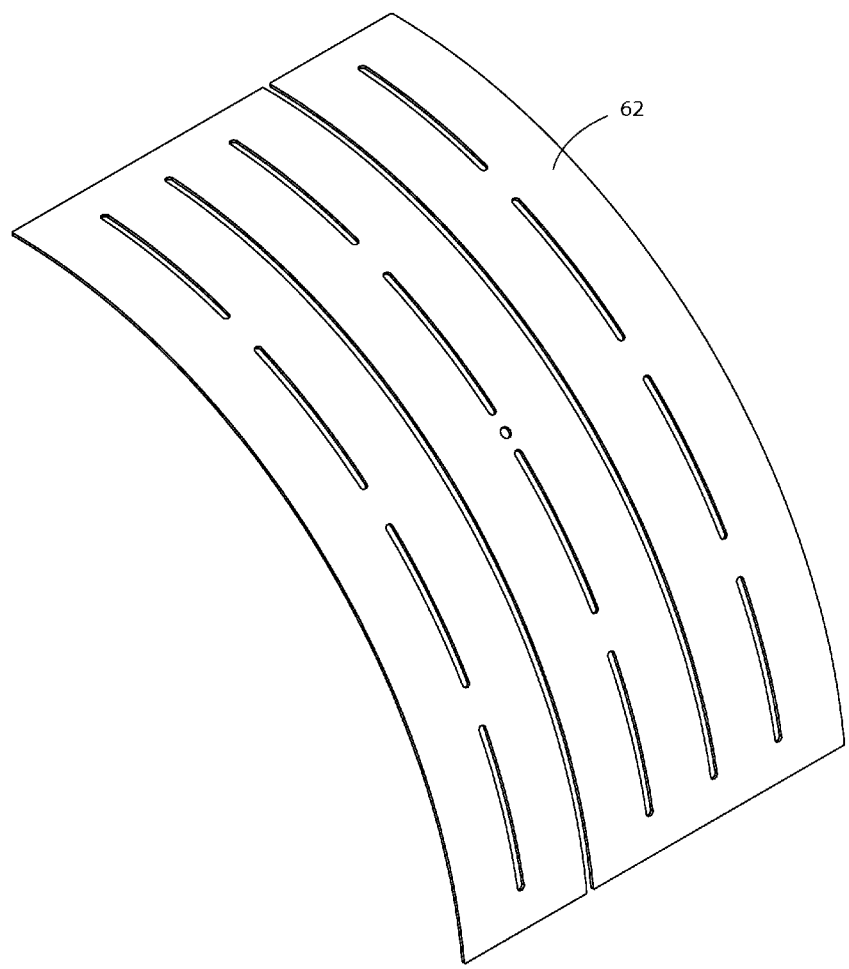
FIG. 9 depicts a perspective view of just the heating element of the heating element assembly shown in FIG. 8.

Although the spinner 12 of the particle separator 10 is self-cleaning and its performance remains generally constant, some particles flung from the spinner (such as tars) have a tendency to stick to nearby walls, where they could then accumulate. This is particularly the case with gasifiers. To this end, when the particle separator 10 is used in a gasifier 40, the gasifier is preferably provided with a heating element assembly 60. The heating element assembly 60 (shown by itself in FIG. 8) comprises a heating element 62, mounting arms 64, a mounting shaft 66, and a junction box 68. The heating element 62 is shown by itself in FIG. 9 and consists of a single serpentine element in the shape of an arcuate panel. The heating element 62 is preferably formed of Inconel® or silicon nitride. The mounting arms 64 are electrically conductive support the heating element 62 in position while also providing electricity to the heating element. The mounting shaft 66 comprises a plurality of concentric electrical conductors and an uncharged outer sleeve. The mounting shaft 66 passes through the wall(s) of the gasifier 40 and support the heating element assembly 60 therefrom. The junction box 68 is configured to attach the heating element assembly 60 to electrical power and to computer. A pair of electrical poles 70 is provided in the junction box 68 and is accessible from the rear of the junction box for supplying the heating element assembly 60 with electrical power. A temperature sensor 72 is attached to the center of the heating element 62 and is attached to a lead wire 74 that extends through the center of the mounting shaft and into the junction box 68.

In use in a gasifier 40, the heating element assembly 60 is positioned such that the heating element 62 is adjacent to the spinner 12 of the particle separator 10. Preferably the spinner 12 of the particle separator 10 is tilted from vertical and the heating element 62 is positioned partially beneath the spinner. The heating element 62 is preferably constantly heated to at least 500 degrees Fahrenheit (260° C.). This temperature liquefies tar and thereby reduces the chance of tar build-up. More preferably, the temperature is kept between 650-750 degrees Fahrenheit (343°-399° C.), which is where the majority of the water-gas shift reaction happens (water gas shift occurs generally between 400° F. and 1000° F.). This converts CO and water to $CO_2$ and $H_2$. Still more preferably, the temperature is maintained at least at 800 degrees Fahrenheit (426° C.), which accomplishes the water-gas shift and is at or above the auto-ignition temperature of most of the particulates. This scavenges any minute amounts of oxygen, converts free carbon (soot) to CO, and accomplishes the water-gas shift. Still further, the temperature can be maintained at 1100-1500 degrees Fahrenheit (593°-816° C.), which accomplishes the above, further converts carbon particles and steam to fuel, and catalytically cracks the tar. The maximum design temperature of the heater is 2,000 'F using Inconel®, such as, for example, Inconel® alloy 625. Thus, as particles are flung from the spinner 12 during the operation of the gasifier 40, they either recirculate back into the combustion region 44 of the gasifier or they strike the heating element 62 (where they then crack, burn, or remain/become liquified). As such, the heating element is self-cleaning and requires no periodic maintenance.

In view of the foregoing, it should be appreciated that the invention achieves the several advantages over the prior art. For example, it should be appreciated that the present invention provides a more foolproof means for filtering particles from gaseous matter and is well suited for use in gasifiers.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A method of separating solid particles from gaseous matter, the method comprising:
    rotating a spinner about a spinner axis in a rotational direction, the spinner having bound fluid passageways that operatively connect a gaseous inlet environment to a gaseous outlet environment, the fluid passageways circumferentially extending in a direction opposite the rotational direction as the fluid passageways extend radially inward, the gaseous inlet environment having a pressure, the gaseous outlet environment having a pressure;
    forcing gaseous matter radially inward through the rotating spinner by creating pressure differential that is such that the pressure of the gaseous inlet environment exceeds the pressure of the gaseous fluid outlet;
    gasifying combustible material within a gasifier, the spinner being located in the gasifier, the gasified combustible material being forced through the spinner by the pressure differential.

2. A method in accordance with claim 1 wherein the spinner is rotated at a minimum of 4000 revolutions per minute.

3. A method in accordance with claim 2 wherein the spinner is rotated at a minimum of 6000 revolutions per minute.

4. A method in accordance with claim 1 wherein the spinner comprises a plurality of vanes that extend in a direction opposite the rotational direction and that partially define the fluid passageways.

5. A method in accordance with claim 4 wherein the spinner comprises an internal cavity that is in fluid communication with each of the fluid passageways and that operatively connects the fluid passageways to the gaseous fluid outlet.

6. A method in accordance with claim 1 wherein the gaseous fluid outlet is partially defined by a volute.

7. A method in accordance with claim 1 wherein the gasifier comprises a heating element positioned adjacent the spinner and the method comprises generating heat within the heating element and causing solid particles to be flung from the spinner and thereafter strike the heating element.

8. A method in accordance with claim 7 wherein the spinner axis is tilted from vertical and the heating element is at least partially beneath the spinner.

9. An assembly comprising:

a spinner, the spinner configured and adapted to rotate about a spinner axis in a rotational direction, the spinner having fluid passageways that operatively connect a gaseous inlet environment to a gaseous outlet environment;

a heating element, the heating element being positioned in the inlet environment adjacent to the spinner in a manner such that particles flung from the spinner can strike the heating element.

10. An assembly in accordance with claim 9 wherein the fluid passageways of the spinner passageways circumferentially extend in a direction opposite the rotational direction as the fluid passageways extend radially inward.

11. An assembly in accordance with claim 9 wherein the heating element is adapted and configured to be heated to a temperature in excess of 800 degrees Fahrenheit (426° C.).

12. An assembly in accordance with claim 9 wherein the assembly comprises a gasifier, and the spinner and heating element are positioned within the gasifier.

13. An assembly in accordance with claim 12 wherein the assembly comprises a waterjet washer configured to spray high pressure water directly at the spinner.

14. An assembly in accordance with claim 9 wherein the spinner axis is tilted from vertical and the heating element is at least partially beneath the spinner.

15. An assembly in accordance with claim 9 wherein the heating element is arcuate.

* * * * *